United States Patent
Pedersen et al.

(10) Patent No.: US 8,761,383 B2
(45) Date of Patent: Jun. 24, 2014

(54) TELEPHONE INTERFACE UNIT AND A METHOD OF CONFIGURING HEADSET SYSTEM TO TELEPHONE DEVICE

(71) Applicants: Thomas Pedersen, Gorlose (DK); Jesper Birk Jepsen, Kastrup (DK)

(72) Inventors: Thomas Pedersen, Gorlose (DK); Jesper Birk Jepsen, Kastrup (DK)

(73) Assignee: GN Netcom A/S (DK)

( * ) Notice: Subject to any disclaimer, the term of this patent is extended or adjusted under 35 U.S.C. 154(b) by 0 days.

(21) Appl. No.: 13/850,774

(22) Filed: Mar. 26, 2013

(65) Prior Publication Data

US 2013/0259223 A1    Oct. 3, 2013

(30) Foreign Application Priority Data

Mar. 30, 2012  (EP) .................................... 12162583

(51) Int. Cl.
*H04M 1/60* (2006.01)

(52) U.S. Cl.
CPC .............. *H04M 1/6033* (2013.01); *H04M 1/60* (2013.01)
USPC ....... 379/387.01; 379/395; 379/422; 379/430

(58) Field of Classification Search
USPC ......... 379/428.02, 422, 430, 441, 44, 399.01, 379/395, 387.012; 455/556.1, 569.1, 569.2, 455/575.2
See application file for complete search history.

(56) References Cited

U.S. PATENT DOCUMENTS

| | | | |
|---|---|---|---|
| 5,544,243 A * | 8/1996 | Papadopoulos | 379/413 |
| 5,729,603 A | 3/1998 | Huddart | |
| 6,091,812 A * | 7/2000 | Iglehart et al. | 379/308 |
| 2011/0268257 A1 * | 11/2011 | Frandsen | 379/26.01 |
| 2011/0306393 A1 * | 12/2011 | Goldman et al. | 455/575.2 |
| 2012/0135785 A1 * | 5/2012 | Enmei | 455/566 |

FOREIGN PATENT DOCUMENTS

EP    2204972    7/2010

* cited by examiner

*Primary Examiner* — Tuan D Nguyen
(74) *Attorney, Agent, or Firm* — Altera Law Group, LLC

(57) ABSTRACT

A self configuring headset system comprising an interface unit, a method of setting up a headset system to a telephone device using and interface unit and a telephone interface unit is provided. The telephone interface unit is configured to automatically set up a headset system to a telephone device, the headset system comprising a headset and the telephone interface unit, the telephone interface unit comprising a switching unit configured to switch at least a headset transmit signal line and a headset receive signal line to a telephone transmit signal line and a telephone receive signal line, respectively, and a processor being pre-programmed with one or more telephone device permutation settings, wherein the processor is configured to receive, from the telephone device, telephone configuration information on the basis of which a specific permutation setting is selected among the one or more pre-programmed permutation settings, the processor being configured to control the switching unit according to the specific permutation setting.

15 Claims, 4 Drawing Sheets

TELEPHONE INTERFACE UNIT AND A METHOD OF CONFIGURING HEADSET SYSTEM TO TELEPHONE DEVICE

TECHNICAL FIELD

The invention relates to headset systems, and especially to a telephone interface unit for automatically configuring a headset system to a telephone device, a self configuring headset system, and a method of automatically configuring a headset system to be used with the telephone device.

BACKGROUND OF THE INVENTION

Despite the introduction of IP telephony implemented in software for use on computers, telephone devices, such as desktop telephones, are still abundant. In particular in professional office use, such telephone devices may be connected to headset systems to enable hands-free telephony. Such headsets are configured to be connected to either a handset port or a specifically provided headset port of the telephone device, often via an interface unit, and the set up of the headset to the specific telephone device is typically dependent on manufacturer, telephone type, make, etc. Even though the telephone line ports of telephone devices are highly regulated and standardized with regards to the electrical properties and port pin-out, such standardization has not taken place regarding the handset ports of the telephone devices.

For each make of a telephone device, the receive and transmit signal lines of the telephone body, i.e. the handset and/or headset ports, must be correctly coupled to the receive and transmit signal lines of the headset. In that no standards exist for the handset and/or headset ports, no standard exists as to which of the signal lines from the telephone handset and/or headsets port constitutes the receive line for signals and which the transmit line. Therefore, a basic set up for a headset system typically includes performing a call to a test user to provide a test signal for the interface unit and to test which combination of receive/transmit settings provides the best signal quality and strength, often using a trial and error switching to test all possible permutation combinations.

The set up or configuration may be manual as e.g. suggested in "Jabra GN9350 Set-up guide", in which a person setting up the headset to a telephone device can select between seven permutation settings, typically via a base, an amplifier or an interface unit. A test call is performed by the person setting up the headset, and the test person receiving the call listen to the caller using the seven permutation settings sequentially. The permutation settings at which the test person indicates that the best signal is received is selected.

The configuration may also be performed automatically or semi-automatically in that the interface unit performs the test call and selects the best connection, and/or the interface unit may connect to a database via the telephone or via a separate interface network connection to receive the specific telephone permutation settings from a look-up table.

It is a disadvantage of the prior art configuration routines that they all require manual interaction during the set up and further that it, in the manual configuration, is a subjective decision of the test caller which permutation setting leads to the "best" result. Furthermore, the prior art configuration routines all require the telephone system to be working before a headset system can be configured.

SUMMARY

It is therefore an object of the present invention to provide a configuration having a simple procedure for setting up the headset system to the telephone device.

According to a first aspect of the present invention, a telephone interface unit configured to automatically set up a headset system to a telephone device is provided. The headset system may comprise a headset and the telephone interface unit. The telephone interface unit may comprise a switching unit configured to switch at least a headset transmit signal line and a headset receive signal line to a telephone transmit signal line and a telephone receive signal line, respectively. The telephone interface unit may further comprise a processor being pre-programmed with one or more telephone device permutation settings. The processor may be configured to receive, from the telephone device, telephone configuration information on the basis of which a specific permutation setting is selected among the one or more pre-programmed permutation settings. The processor may further be configured to control the switching unit to switch at least the headset transmit signal line and the headset receive signal line to the telephone transmit signal line and the telephone receive signal line, respectively, according to the specific permutation setting.

Thus, to accommodate for the lack of standardization, a telephone interface unit is provided in the signal line between the headset and the telephone device to enable communication between headset and telephone device. The telephone interface unit may embody a base unit for a wireless headset or an amplifier for a wired headset so that the telephone interface unit forms part of the headset system. Typically, the telephone interface unit is designed for use with one or more specific telephone models to enable adapting the telephone interface unit to the individual features of the specific telephone models.

In another aspect of the present invention, a method of setting up a headset system to a telephone device is provided. The headset system may comprise a headset and a telephone interface unit, and the headset may be connectable to the telephone interface unit which is configured to interconnect the telephone device and the headset. The method may comprise the step of receiving in the telephone interface unit, telephone configuration information from the telephone device and may further comprise selecting in a processor a specific pre-programmed permutation setting based on the received telephone configuration information. The processor may be controlled to switch a switching unit, such as a switching circuit or a switching unit implemented in a processor, in the telephone interface unit, the switching unit being configured to connect a headset transmit signal line and a headset receive signal line to a telephone transmit signal line and a telephone receive signal line, respectively, in accordance with the specific pre-programmed permutation setting.

In a further aspect of the present invention a self-configuring headset system is provided. The headset system may comprise a headset and a telephone interface unit. The telephone interface unit may comprise a switching unit configured to switch at least a headset transmit signal line and a headset receive signal line to a telephone transmit signal line and a telephone receive signal line, respectively. Furthermore, a processor may be pre-programmed with one or more telephone device permutation settings. The processor may be configured to receive, from the telephone device, telephone configuration information on the basis of which a specific permutation setting is selected among the one or more pre-programmed permutation settings. The processor may be configured to control the switching unit to switch at least the headset transmit signal line and the headset receive signal line to the telephone transmit signal line and the telephone receive signal line, respectively, according to the specific permutation setting.

It is advantageous to provide telephone configuration information automatically from the telephone device to the telephone interface unit, in that no action from a user is required during set up, thereby reducing the risk of a user performing mistakes during set up which may have an impact on the sound quality of the headset audio performance. The automatic set up further eliminates the subjective evaluation of call quality, thus improving the overall quality of the call, and furthermore minimizes the risk of choosing a faulty or incorrect set up which may not be working for further calls, thus necessitating a renewed set up procedure.

The headset system may comprise a base unit or an amplifier and a headset, and the headset may be connected to the amplifier via a wired connection, or the headset may communicate wirelessly with the base unit, such as via a standard wireless protocol, such as for example DECT or Bluetooth. The telephone interface unit may then interconnect the base unit or the amplifier and the telephone device.

The telephone configuration information may be provided to the telephone interface unit during an initial set up of the telephone device. The telephone configuration information may be provided via an audio channel connecting the telephone interface unit and the telephone device. Additionally or alternatively, the telephone configuration information may be communicated via a separate electrical information signal line.

In one or more embodiments, the telephone interface unit may request the telephone configuration information from the telephone device upon powering up of the telephone device and/or the headset system.

The telephone interface unit may comprise a processor configured to receive the telephone configuration information from the telephone device. The telephone interface unit may further comprise a processor being pre-programmed with one or more telephone device permutation settings. Thus, the processor may be pre-programmed from the manufacturer so that a plurality of telephone device permutation settings may be provided in the processor. The permutation settings may be provided in the processor in any form, such as in a list, in stack, in a matrix, etc. Typically, the headset system manufacturer and the telephone device manufacturer will communicate prior to manufacturing so as to agree how the permutation settings may be accessed in the processor. Hereby, it is achieved that the telephone configuration information may be a simple code pointing to the specific permutation setting in the processor, such as a number pointing to a specific item in the list, such as a matrix position, etc. Thus, the telephone configuration information may comprise a pointer pointing to the specific pre-programmed permutation setting in the processor. Thereby, the processor may select the specific permutation setting among the one or more pre-programmed permutation settings. The processor may further be configured to control the switching unit according to the specific permutation setting.

The telephone interface unit may further comprise a variable gain unit, such as a variable gain unit, configured to set the gain of the headset transmit signal line. In one or more embodiments of the headset system, the telephone interface unit may be configured to receive telephone receive settings and the processor may be configured to control the variable gain unit in accordance with the telephone receive settings.

The processor in the interface unit may further be configured for receiving volume control settings from the telephone device and adjusting the headset receive volume according to the received volume control settings.

In one or more embodiments of the present invention, the set up is performed automatically based on the received telephone configuration information, without receiving a test signal. It is an advantage that the set up may be performed without receiving a test signal, as the headset systems may then be set up or configured to corresponding telephone devices, even without having a working telephone connection. Thus, the set up may be performed with any powered telephone device.

The switching unit may be configured to switch at least a headset transmit signal line and a headset receive signal line to a telephone transmit signal line and a telephone receive signal line, respectively. The switching unit may be implemented using a plurality of switches, however, it is also envisaged that the switching unit may be implemented in any other way.

The physical mapping of the telephone transmit signal line and the telephone receive signal line to the headset transmit signal line and the headset receive signal line, respectively, is typically denoted the telephone permutation settings, and the permutation settings may comprise information on telephone signal line settings.

Typically, a telephone handset and/or headset port is a 6-wire or a 4-wire port interface, and the permutation settings describe the appropriate 6-wire or 4-wire terminal configuration of the telephone device. For example, a 4-wire handset and/or headset port allows for the establishment and selection of 2-wire each send (Tx) and receive (Rx) line pairs. The two connections of a transmit pair of electrical lines may be denoted Tx+ and Tx−, and the two connections of a receive pair of electrical lines may be denoted Rx+ and Rx−. The send and receive pairs may not be the same two lines in the port and may share a common return signal line. Thus, the electrical connections between the telephone device and the telephone interface unit may comprise two pairs of electrical lines having a number of distinct permutation settings.

Typically, seven different permutation settings are used in the telephone devices, such that if each of the four pins in the handset and/or headset port is denoted PIN 1, PIN 2, PIN 3 and PIN 4, respectively, and the potential permutation settings are denoted A through G, the following matrix of possible settings is achieved

|   | PIN 1 | PIN 2 | PIN 3 | PIN 4 |
|---|-------|-------|-------|-------|
| A | TX+   | RX+   | RX−   | TX−   |
| B | RX+   | TX+   | TX−   | RX−   |
| C | TX+   | TX−   | RX+   | RX−   |
| D | RX+   | RX−   | TX+   | TX−   |
| E | TX+   | RX+   | TX−   | RX−   |
| F | RX+   | TX+   | RX−   | TX−   |
| G | TX+   | RX+   | RX−   | TX−   |

It is however envisaged that also other permutation settings may apply for other telephone devices, either having more than seven different permutation settings, such as eleven or fifteen different permutation settings, or the system may have less than seven permutation settings, such as having less than seven permutation settings, such as having three permutation settings. Furthermore, extra lines may be used for communicating e.g. telephone configuration information, telephone signal line settings such as telephone receive settings or volume control settings.

The switching unit may comprise a plurality of switches for switching at least the headset transmit signal line and the headset receive signal line to the telephone transmit signal line and the telephone receive signal line according to the permutation settings. The headset transmit signal line thus comprises a pair of electrical lines, corresponding to the Tx+ and Tx− electrical signal lines. Each of the plurality of switches may couple a specific line, such as coupling one telephone signal line to one headset signal line, or the plurality of switches may co-operate to configure the switching unit to switch the lines according to the permutation settings.

The plurality of switches may be provided in a switch matrix, settable to any of a plurality of switch configurations, such as to any of the switch configurations as set out in the table above, wherein each switch configuration in the plurality of switch configurations comprises a predetermined setting for each of the plurality of switches, and/or such as to any of the pre-programmed permutation settings provided in the processor.

The processor may set the switch matrix to a switch configuration by setting the plurality of switches to the predetermined setting for the switch configuration to be obtained.

The data communicated between the telephone device and the headset system may relate to audio and voice in particular, and may also comprise control commands, such as control commands for establishing and disconnecting a telephone connection, adjusting a volume or muting a connection.

The interface unit may allow for communication of data comprising control commands between the telephone device and the headset system, so that also instruction data may be communicated between the telephone device and the headset system. In one or more embodiments, the telephone interface unit may comprise an electronic hook switch operation, the electronic hook switch operation enabling remote switching of a telephone connection via the headset system analogously to the operation of a mechanical hook of a telephone. Thus, the telephone device and the telephone interface unit communicate to allow instructions as to hook-on and hook-off states to be communicated between the telephone and the headset system. The electronic hook switch system may thus have the same functionality as conventional (mechanical) hook systems of a desktop telephone for connecting and disconnection communication connections electronically, and may be an electronic solution that enables remote operation of compatible wireless headsets with various phones.

A user may thus activate control commands of the interface unit via the headset, such as via control elements, such as for example push buttons or adjustment wheels, on the headset. Thereby, for e.g. a headset connected wirelessly to the headset base unit, such as a headset base unit provided in a telephone interface unit, a user may activate control commands remotely from the telephone device.

It is an advantage that as mobility within the working environment continues to increase, the users have the possibility of remotely controlling an associated telephone device, such as a desktop telephone.

In one or more embodiments of the present invention, the headset base unit or amplifier and the telephone interface unit may be provided as one device, so that the headset base unit or the amplifier may comprise the telephone interface unit or vice versa.

The telephone configuration information may be provided from the telephone device to the telephone interface unit in accordance with a first protocol, such as a protocol as determined by the telephone device manufacturer. The first protocol may advantageously correspond to the protocol used for transferring Electronic Hook Switch commands. In one or more embodiments, the telephone configuration information may be comprised by at least one data message. The at least one data message may be received in the processor for unpacking and interpretation of the data message content.

In one or more embodiments, the telephone interface unit may comprise a memory unit for storing the telephone permutation settings. The processor may thereafter be configured to read the telephone permutation settings from the memory unit. The memory unit may be any memory unit, such as a memory circuit, an EEPROM, etc.

In one or more embodiments, the telephone configuration information may comprise telephone model information. The memory unit may store data sets comprising corresponding telephone model information and telephone permutation settings, and the telephone configuration information may comprise a pointer pointing the processor to the specific data set of telephone model and telephone permutation settings. The processor may be configured to read from the memory unit the corresponding specific permutation settings and control the switching unit according to these specific telephone permutation settings.

Furthermore, in a method of setting up a headset system to a telephone device, the headset system may be connectable to a telephone interface unit configured to interconnect the telephone device and the headset system. The telephone interface unit may be a telephone interface unit as described herein. The method may comprise receiving in the telephone interface unit telephone configuration information from the telephone device, selecting in the processor a specific pre-programmed permutation setting based on the received telephone configuration information, and controlling the processor to switch the switching unit in the telephone interface unit in accordance with the specific pre-programmed permutation setting.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will, thus, not be described in detail with respect to the description of each figure.

DETAILED DESCRIPTIONS OF THE DRAWINGS

Figure 1A:
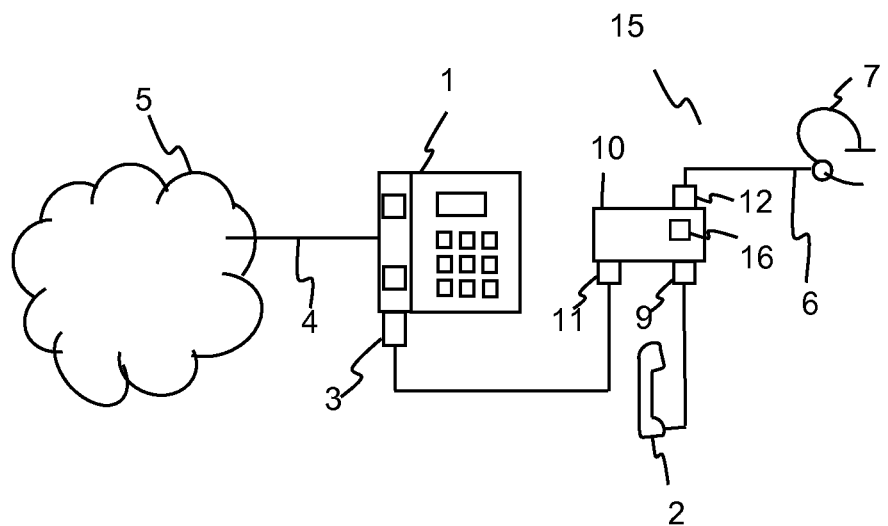
FIGS. 1a and 1b show schematically a telephone device connected to different headset systems.

A telephone device 1 is shown in FIG. 1a. A handset 2 is forming part of the telephone device 1, and the handset 2 is connected to the telephone device 1 via the interface unit 10, so that the handset 2 is connected to port 9 on the interface unit 10 which again is connected to handset port 3 on the telephone device 1. The telephone device 1 is connected to a telecommunication network 5 by a telephone line 4. Most commonly, the telephone device 1 is sold including the handset 2 as part of a kit. However, whereas the telephone line 4 is well regulated with regards to the physical properties of the plug socket, the pin-out of the plug, and the electrical signals, so that every pin is specified, the handset port 3 of the telephone device 1 is unregulated. Therefore, many variations of the handset port 3 are found in the vast number of telephone device models and manufactures found in use. This is not an issue, as long as the telephone device 1 is merely used with the corresponding handset 2.

However, this means that when connecting a headset 7 to the telephone device 1, as illustrated in FIG. 1*a*, typically, an interface unit 10 must be provided between the headset 7 and the handset port 3 to accommodate differences between different telephone devices 1.

In FIG. 1*a*, the interface unit 10 is connected to handset port 3 via interface port 11. The interface unit has a handset port 9 for connecting the handset 2 to the telephone device 1 and a connection device, headset port 12, for connecting the interface unit 10 to the wired headset 7 via connection line 6. In this case, the interface unit 10 must be configured for the handset port 3 of the phone. The interface unit further comprises an amplifier 16 for the headset. The interface unit 10 and the headset 7 form a headset system 15.

Figure 1B:
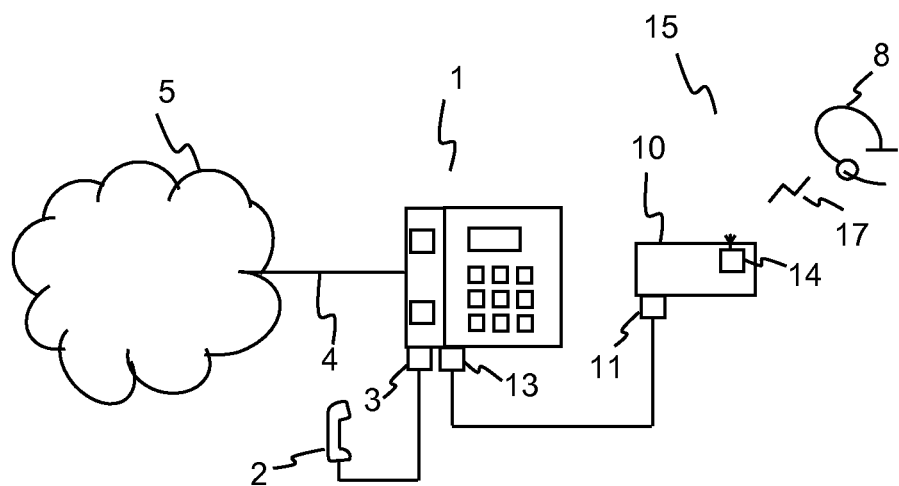

In FIG. 1*b*, another exemplary telephone device 1 and headset system 15 are shown. The telephone device 1 has a separate headset port 13, besides the conventional handset port 3, for connecting the headset system 15 to the telephone device 1. Hereby, the handset 2 remains connected directly to the handset port 3 of the telephone device 1, and the interface unit 10 is connected to the headset port 13. Typically, the headset ports 13 of telephone devices 1 are as unregulated as the handset ports. The interface unit 10 comprises a base unit functionality for the wireless headset 8 so that the headset system 15 comprises the wireless headset 8 and the interface unit 10. The interface unit as shown in FIG. 1*b* has a connection device 14, such as a transceiver and antenna device 14, connecting the interface unit 10 with the headset 8 via wireless connection 17 for establishing communication with headset 8.

It is envisaged that either type of headset, i.e. wired as headset 7 or wireless as headset 8, may be used with either the headset port or the handset port solution as illustrated in FIGS. 1*a* and 1*b*.

The headsets 7, 8 must be configured for use with the specific telephone device 1. However, as headsets 7, 8 are sold independently of the telephone devices 1, the headsets must have a flexible set up allowing connection to any telephone device 1. Typically, this is achieved through the interface unit 10.

Figure 2:
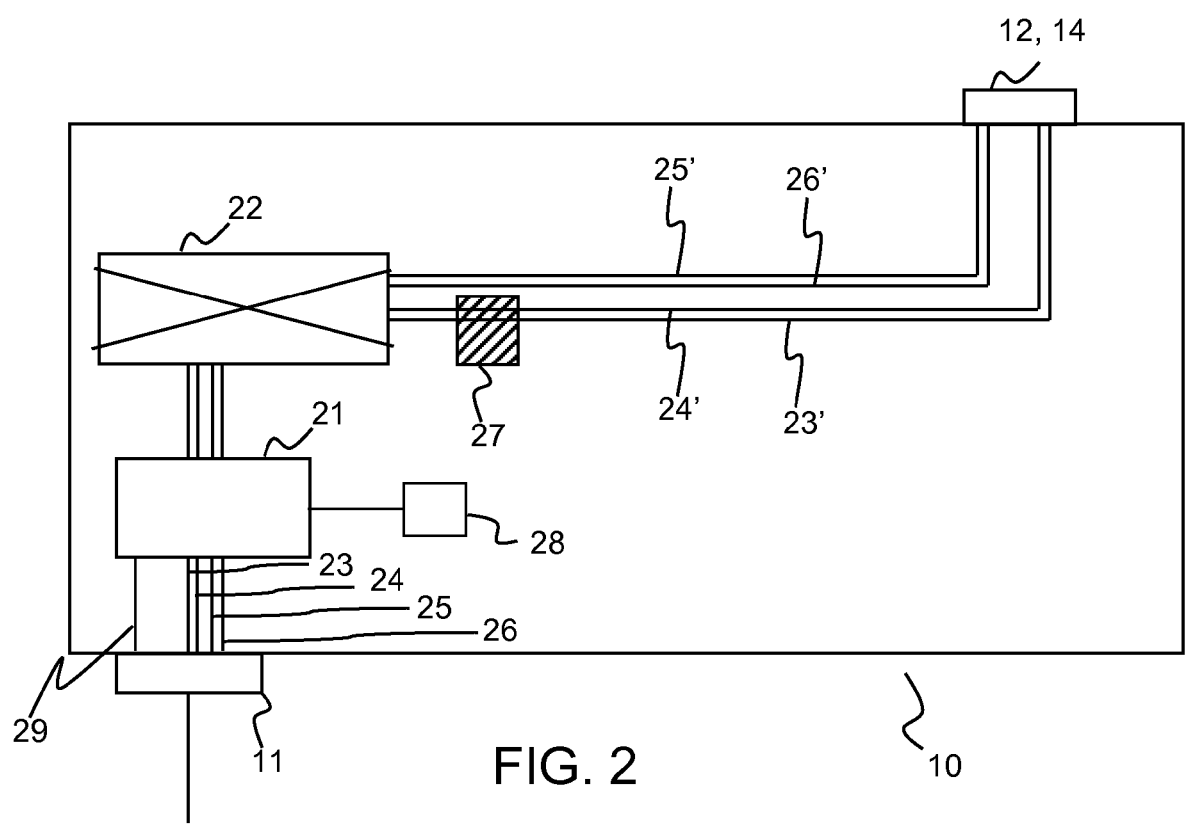
FIG. 2 shows schematically a telephone interface unit.

In FIG. 2 the interface unit 10 is shown schematically. The interface unit 10 comprises a switching unit 22, such as a switching circuit, configured to switch at least a telephone transmit signal line 23, 24, i.e. electrical signal lines Tx+ and Tx−, and a telephone receive signal line 25, 26, i.e. electrical signal lines, Rx+, Rx−, to a headset transmit signal line 23', 24' and a headset receive signal line 25', 26', respectively. The interface unit further comprises a processor 21 configured to control the switching unit 22. To achieve an automatic set up of the headset system 15, the telephone interface unit 10 is configured to receive, from the telephone device, telephone configuration information. Based on the telephone configuration information a specific one of a plurality of pre-programmed telephone permutation settings in the processor is selected. The processor controls the switching unit 22 to switch the signal lines according to the specific pre-programmed telephone permutation setting.

The permutation settings refer to the, generally, four signal lines of the handset port 3 and/or headset port 13 which consist of a pair of transmit lines and a pair of receive lines, respectively denominated as TX+, TX−, RX+, and RX−. Thus, 24 separate settings exist. However, the polarity is in general not significant, meaning, e.g. that TX+ on the telephone device 1 may be connected to TX− on the telephone interface unit 10 without detrimental effects. This reduces number of distinct permutation settings to 6. The 6 distinct permutation settings are labelled "A"-"F", according to this table, where PIN 1-PIN 4 are the corresponding wire connections or pins. Setting "G" is special since the permutation setting is identical to "A" but with a different electrical set up corresponding to a microphone of the carbon type. It is envisaged that also further special settings may be provided having other different electrical settings, thus increasing the number of possible permutation settings. Furthermore, other signal lines may be provided, such as a signal line 29 for communicating other information, such as e.g. telephone configuration information.

|   | PIN 1 | PIN 2 | PIN 3 | PIN 4 |
|---|-------|-------|-------|-------|
| A | TX+ | RX+ | RX− | TX− |
| B | RX+ | TX+ | TX− | RX− |
| C | TX+ | TX− | RX+ | RX− |
| D | RX+ | RX− | TX+ | TX− |
| E | TX+ | RX+ | TX− | RX− |
| F | RX+ | TX+ | RX− | TX− |
| G | TX+ | RX+ | RX− | TX− |

The telephone interface unit 10 further comprises a variable gain unit 27, such as a variable gain circuit or a processor implemented to set the variable gain, configured to set the gain of the headset transmit signal line 23'. The telephone interface unit is configured to receive telephone receive settings and the processor is configured to control the variable gain unit in accordance with the telephone receive settings.

The telephone configuration information may comprise the telephone receive settings, the telephone transmit settings and/or the telephone permutation settings and/or a pointer, such as a pointer to a specific pre-programmed permutation setting, and may be provided from the telephone device 1 to the telephone interface unit 10 via a separate electrical information signal line 29, or the telephone configuration information may be provided via the transmit/receive signal lines.

Figure 3:
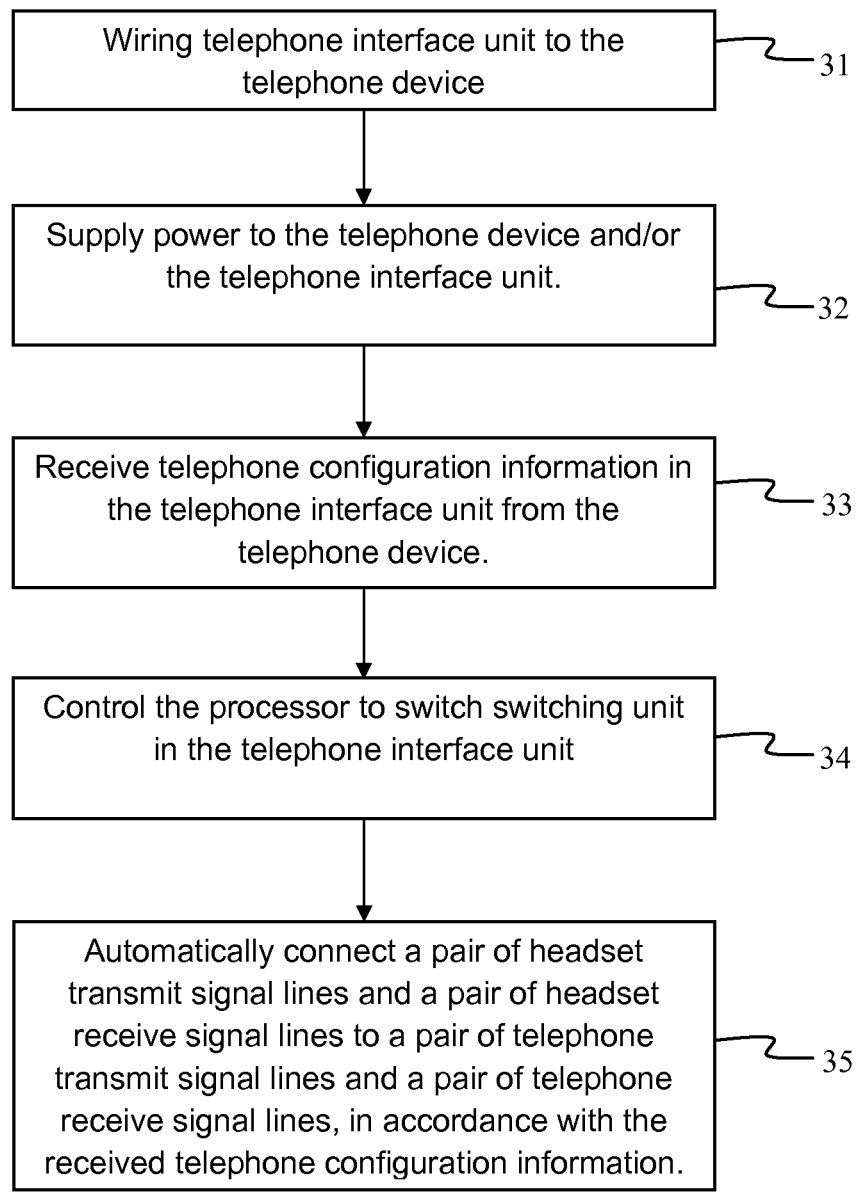
FIG. 3 shows a flowchart describing a method of setting up a headset system to a telephone device.

In FIG. 3, a flow chart 30 is shown, illustrating a method of setting up a headset system to a telephone device, wherein the headset system is connectable to a telephone interface unit configured to interconnect the telephone and the headset. In step 31, the telephone interface unit is wired to the telephone device, and in step 32, power is supplied to the telephone device and/or the telephone interface unit. In step 33, telephone configuration information is received in the telephone interface unit from the telephone device. In step 34, the processor is controlled to switch a switching unit in the telephone interface unit 10, to thereby in step 35, automatically connect a pair of headset transmit signal lines and a pair of headset receive signal lines to a pair of telephone transmit signal lines and a pair of telephone receive signal lines, in accordance with the received telephone configuration information. The connection is thus performed based on the configuration information received from the telephone device, without further user interaction, and without having to perform a test call to set up the telephone interface unit.

Figure 4:
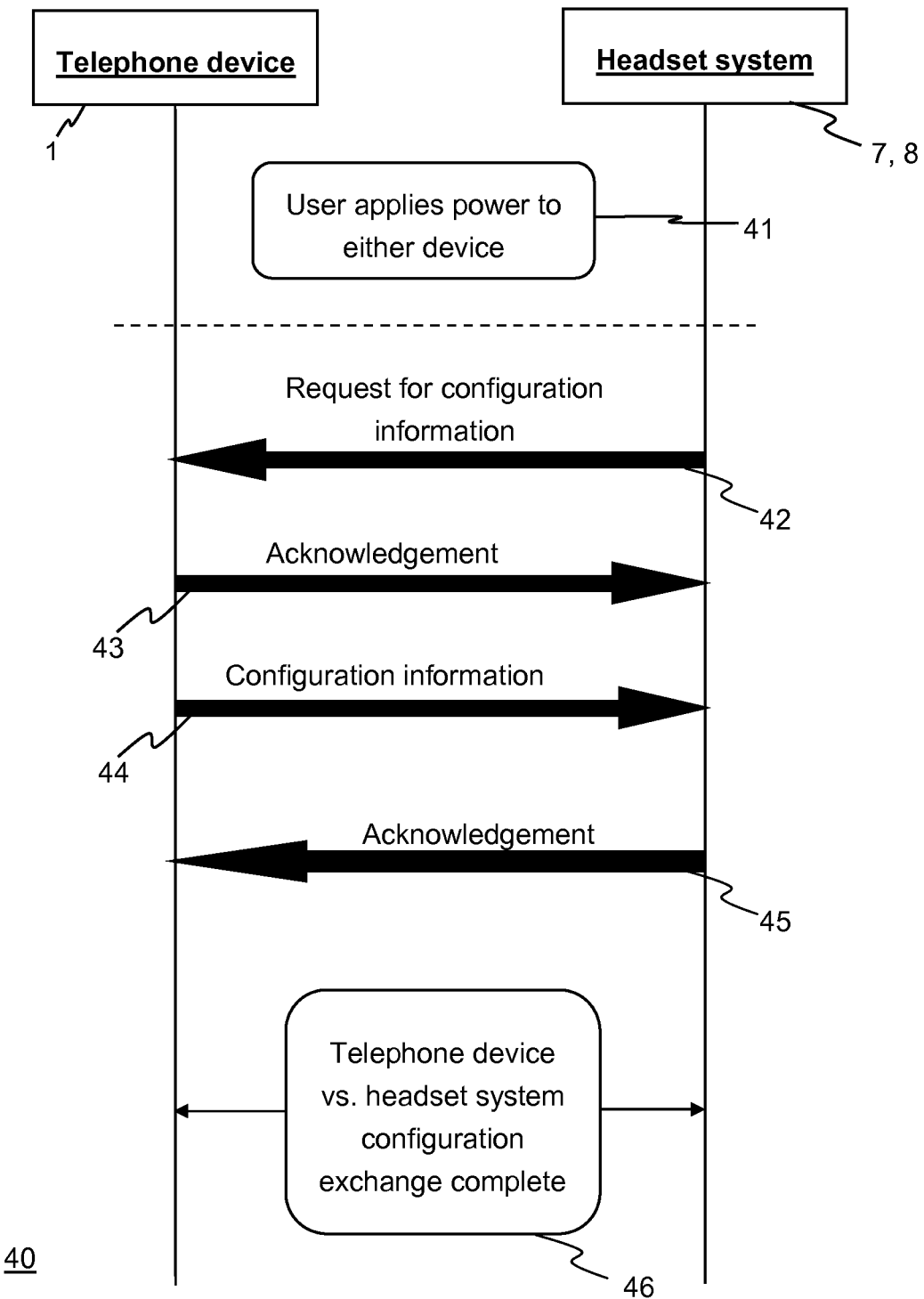
FIG. 4 shows a sequence of commands emitted between the telephone device and the headset system.

In FIG. 4, a sequence of commands communicated between the telephone device 1, such as a desk phone, and a headset system 15 via a telephone interface unit 10 is illustrated. First, a user applies power to the telephone device 1 and the headset system, step 41. The headset requests configuration information from the telephone device in command 42. The configuration information may comprise information on for example permutation settings and/or telephone receive and/or transmit settings. An acknowledgement that the request has been received, is sent from the telephone device 1 to the headset system 15 in command 43. The requested configuration information is sent from the telephone device 1 to the headset system 15 in command 44. An acknowledgement, command 45, is sent from the headset system 15 to the telephone device 1. Hereafter, the telephone device 1 vs. headset system 15 configuration exchange is complete as indicated in 46. The configuration information may be stored in the memory unit for later implementation in the processor, or the configuration information may be implemented in the processor immediately to avoid delays.

After implementation of the configuration information, the headset set up procedure has been completed and the headset is ready to use.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed as being a reference to the plural and vice versa.

In the description above, it will be understood that when an element such as being "on", "onto" or "connected to" another element, the element is either directly on or connected to the other element, or intervening elements may also be present.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A telephone interface unit configured to automatically set up a headset system to a telephone device, the headset system comprising a headset and the telephone interface unit, the telephone interface unit comprising
   a switching unit configured to switch at least a headset transmit signal line and a headset receive signal line to a telephone transmit signal line and a telephone receive signal line, respectively, and
   a processor being pre-programmed with one or more telephone device permutation settings,
   wherein the processor is configured to receive, from the telephone device, telephone configuration information on the basis of which a specific permutation setting is selected among the one or more pre-programmed permutation settings, the processor being configured to control the switching unit to switch at least the headset transmit signal line and the headset receive signal line to the telephone transmit signal line and the telephone receive signal line, respectively, according to the specific permutation setting.

2. A telephone interface unit according to claim 1, wherein the telephone configuration information comprises a pointer to the specific permutation setting.

3. A telephone interface unit according to claim 1, wherein the telephone interface unit further comprises a variable gain unit configured to set the gain of the headset transmit signal line.

4. A telephone interface unit according to claim 1, wherein the processor is configured for receiving volume control settings and adjusting the headset receive volume according to the received volume control settings.

5. A telephone interface unit according to claim 1, wherein the set up is performed automatically based on the received telephone configuration information, without receiving a test signal.

6. A telephone interface unit according to claim 1, wherein the telephone interface unit further comprises an electronic hook switch operation.

7. A telephone interface unit according to claim 1, wherein the switching unit comprises a plurality of switches.

8. A telephone interface unit according to claim 7, wherein each of the plurality of switches couples one telephone signal line to one headset signal line.

9. A telephone interface unit according to claim 7, wherein the plurality of switches are provided in a switch matrix, settable to any of a plurality of switch configurations, wherein each switch configuration in the plurality of switch configurations comprises a predetermined setting for each of the plurality of switches, and
   the processor being configured to set the switch matrix to a switch configuration by setting the plurality of switches to the predetermined setting for the switch configuration.

10. A telephone interface unit according to claim 1, wherein the telephone configuration information is provided from the telephone device to the telephone interface unit in accordance with a first protocol.

11. A telephone interface unit according to claim 1, wherein the telephone configuration information comprises telephone model information and wherein the telephone interface unit comprises a memory unit for storing data sets comprising telephone model information and telephone permutation settings, the processor being configured to read from the memory unit the specific permutation setting corresponding to the telephone model information provided with the telephone configuration information.

12. A telephone interface unit according to claim 10, wherein the telephone configuration information is comprised by at least one data message.

13. A telephone interface unit according to claim 1, wherein the permutation settings comprises information on telephone signal line settings.

14. A method of setting up a headset system to a telephone device, the headset system comprising a headset and a telephone interface unit, wherein the headset is connectable to the telephone interface unit configured to interconnect the telephone device and the headset, the method comprising the steps of
   receiving in the telephone interface unit, telephone configuration information from the telephone device,
   selecting in a processor a specific pre-programmed permutation setting based on the received telephone configuration information,
   controlling the processor to switch a switching unit in the telephone interface unit to connect a headset transmit signal line and a headset receive signal line to a telephone transmit signal line and a telephone receive signal line, in accordance with the specific pre-programmed permutation setting.

15. A self-configuring headset system, the headset system comprising a headset and a telephone interface unit, the telephone interface unit comprising

- a switching unit configured to switch at least a headset transmit signal line and a headset receive signal line to a telephone transmit signal line and a telephone receive signal line, respectively, and
- a processor being pre-programmed with one or more telephone device permutation settings,
- wherein the processor is configured to receive, from the telephone device, telephone configuration information on the basis of which a specific permutation setting is selected among the one or more pre-programmed permutation settings, the processor being configured to control the switching unit to switch at least the headset transmit signal line and the headset receive signal line to the telephone transmit signal line and the telephone receive signal line, respectively, according to the specific permutation setting.

* * * * *